Figure 6:
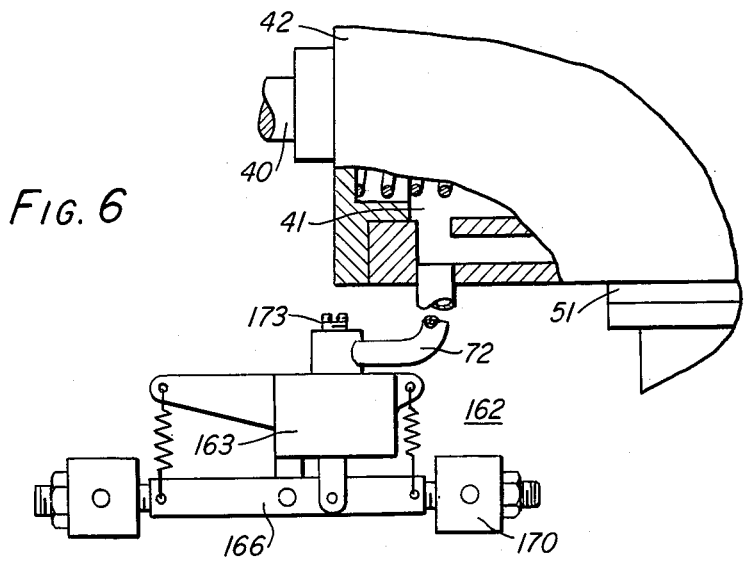

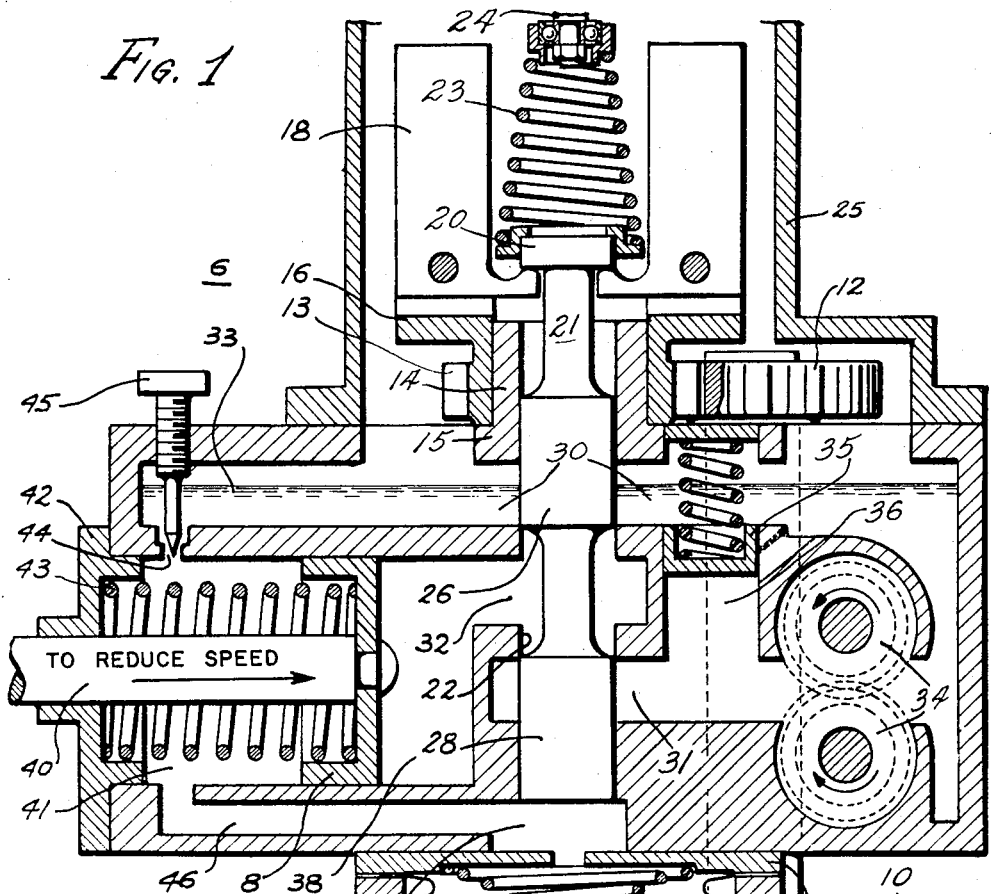

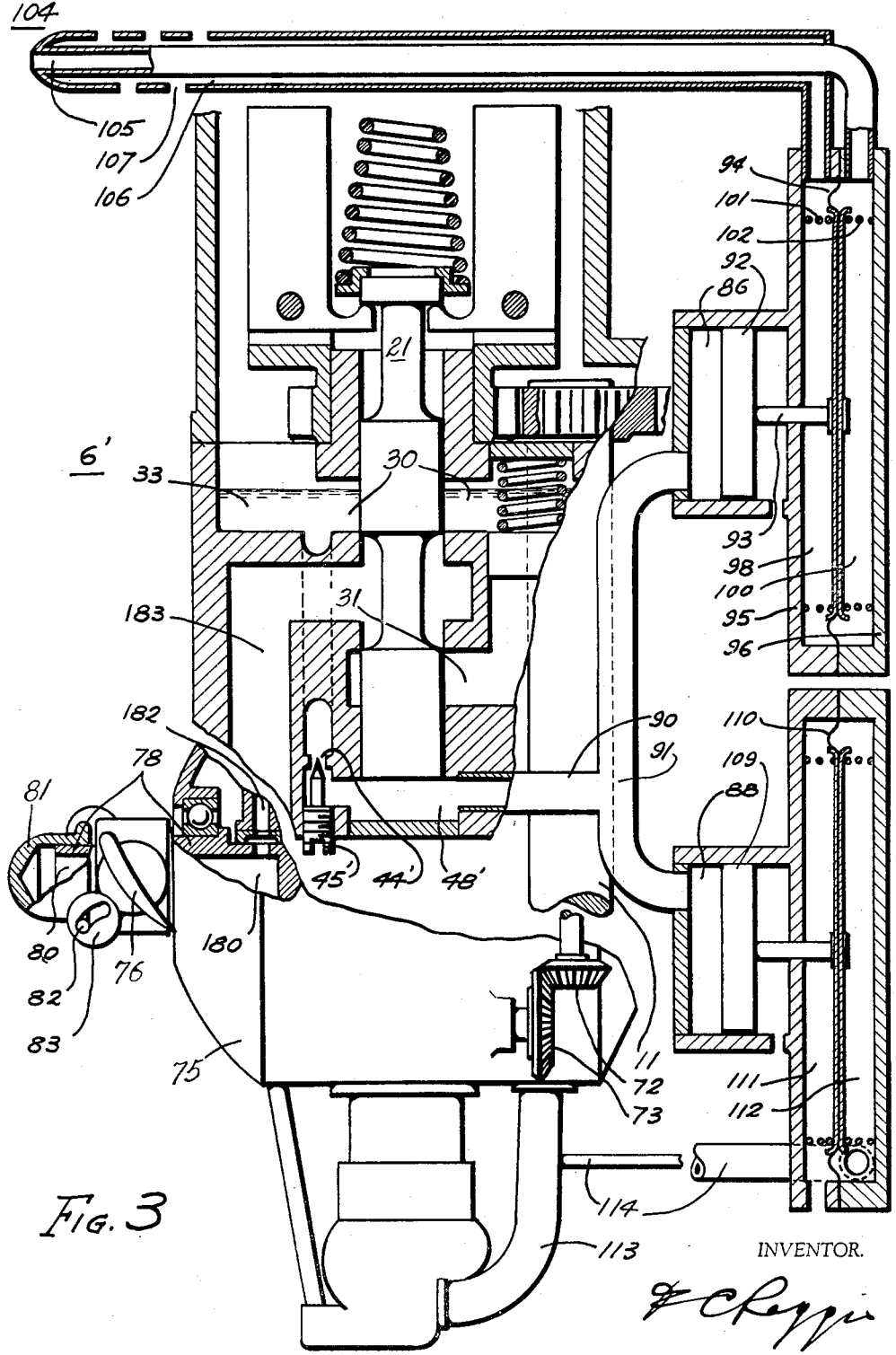

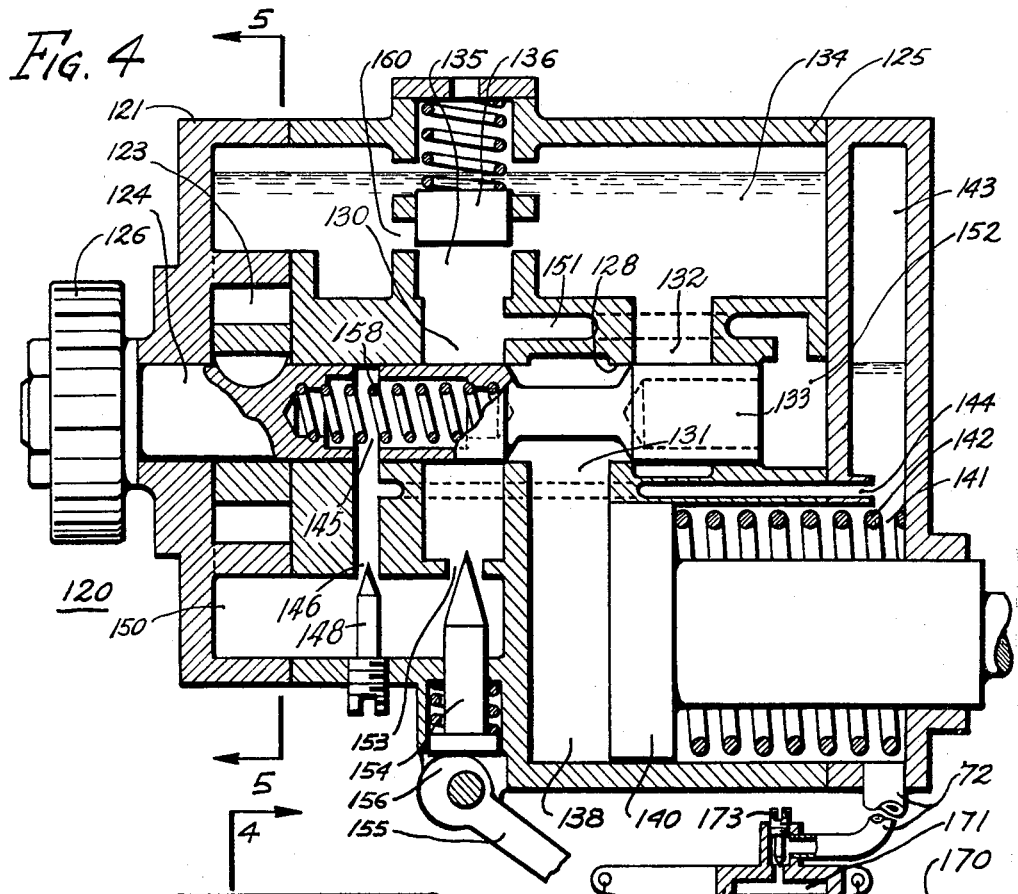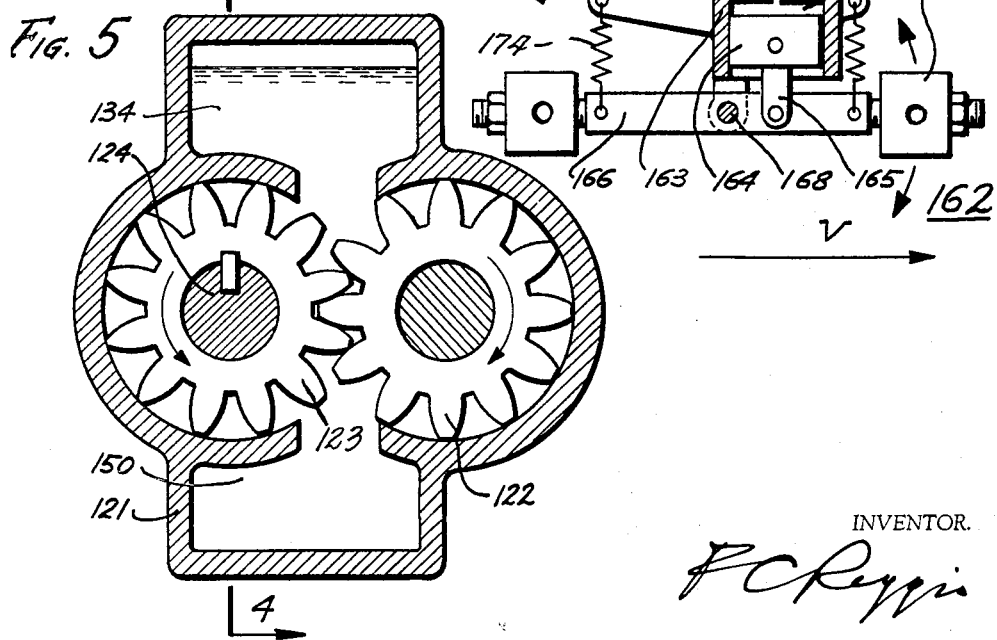

Dec. 20, 1960      F. C. REGGIO      2,965,179
REGULATING DEVICE

Original Filed Nov. 18, 1942      4 Sheets-Sheet 4

INVENTOR

P C Reggio

United States Patent Office 2,965,179
Patented Dec. 20, 1960

1

2,965,179
REGULATING DEVICE

Ferdinando Carlo Reggio, Tampa, Fla.
(P.O. Box 692, Norwalk, Conn.)

Division of application Ser. No. 694,824, Nov. 6, 1957, now Patent No. 2,910,969, dated Nov. 3, 1959, and application Ser. No. 402,452, Jan. 6, 1954, now Patent No. 2,812,746, dated Nov. 12, 1957, which is a continuation of abandoned application Ser. No. 466,041, Nov. 18, 1942. This application Mar. 30, 1959, Ser. No. 803,055

15 Claims. (Cl. 170—135.72)

This invention relates to regulating systems such as speed governors or similar control apparatus provided with stabilizing or anticipatory means to prevent hunting, secure automatic compensation for certain variables or regulate the rate of response of the system to changes in the controlling operating conditions. The instant application is a division of my application Serial No. 694,824 filed November 6, 1957, now U.S. Patent No. 2,910,969 and application Serial No. 402,452 filed January 6, 1954, now Patent No. 2,812,746 dated November 12, 1957, which is a continuation of my application Serial No. 466,041 filed November 18, 1942, now abandoned.

One of the objects is to provide a speed regulating system which is comparatively simple and compact, requires a small number of moving parts and is relatively inexpensive to manufacture.

Another object is to provide a speed regulating system including a servo motor, a pilot valve therefor actuated in response to speed variations, and means for applying to the pilot valve a compensating, anticipatory or restraining fluid pressure load which varies with changes in preselected operating conditions.

A further object is to provide a simple and accurate speed regulating system including a speed governor and one or more devices operatively connected with the governor for biasing the same in response to changes in one or more operative conditions affecting the speed to be regulated.

Still another object resides in the provision of anticipatory and stabilizing means in connection with regulating devices for preventing irregular operation thereof such as hunting or throbbing.

A further object of the invention is to provide improved control systems which are capable of decreasing the time lag between the input signal and the initiation of the output response, and of controlling the speed rate of such response.

Another object is a regulating system which provides engine speed regulation to compensate for speed variations due either to load changes or to throttle position changes and does so accurately and efficiently and without hunting.

A further object is to provide a device of the type described capable of limiting the rate of change of the condition being controlled to a predetermined value, rewardless of the rate of change of the input signal.

Other objects and advantages of the invention will become apparent from the following description taken in connection with the accompanying drawings, in which:

Figure 1 is a section through a speed regulating system for the control of a prime mover connected with an electric generator. Figure 2 is a fragmentary section indicating a partial modification of the governor of Figure 1. Figure 3 is a section through an aircraft engine speed regulating system. Figure 4 is a section through a speed regulating system particularly intended for a vehicle, and

2

Figure 7:
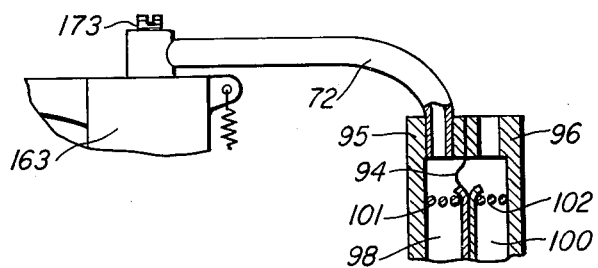
Figure 8:
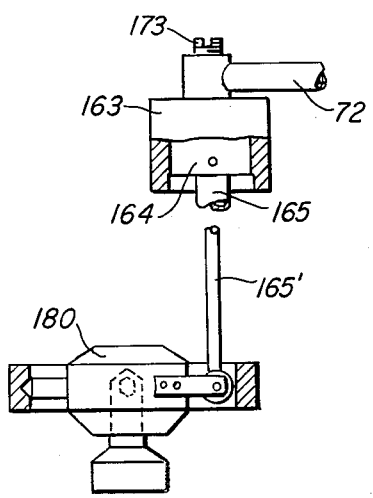

Figure 5 is a section along the line 5—5 of Figure 4. Figures 6, 7 and 8 show partial modifications of Figures 1, 3 and 4, respectively.

The illustrative embodiment shown in Figure 1 includes a hydraulic governor 6 having a servo piston 8 for controlling the supply of actuating substance to a prime mover driving a generator which supplies electric current to a network 10. Neither the generator nor the prime mover is shown in the drawing. A shaft 11 driven from the prime mover carries a gear 12 which engages a companion gear 13 rotatably mounted on a cylindrical extension 14 of the governor body 15. A yoke 16 formed at the upper end of the gear 13 carries flyballs 18 engaging the collar 20 of a pilot valve 21 slidably and rotatably mounted in a bore 22 formed in the governor body 15 coaxial with the cylindrical extension 14. A speeder spring 23 applies axial downward load to the pilot valve 21 directed against the centrifugal load transmitted thereto by the flyballs 18. An axially adjustable member 24 connected by way of a ball bearing with the spring 23 serves to control the load of the latter and in turn the speed of the prime mover. A governor cover 25, only partially shown, may be provided for enclosing the flyball mechanism and guiding the slidable member 24. In operation of the pilot valve 21 is driven in rotation by the flyballs 18 owing to the friction therebetween.

The pilot valve 21 has lands 26, 28 slidably fitting the bore 22 and functioning as plugs to cover and uncover the lateral ports 30 and 31 respectively. Between lands 26 and 28 the pilot valve has a portion of reduced diameter, and the open space so afforded communicates with a lateral passage 32 at all times. The pilot valve is shown in neutral position, in which both sets of ports 30 and 31 are closed. An oil reservoir 33 is provided in the governor body 15 and communicates with the flyball compartment, with ports 30 and with the suction side of a gear pump 34 which may be driven from the governor shaft 11. The discharge side of this pump is connected with the ports 31 and with a pressure oil accumulator comprising a spring-loaded valve plunger 35 slidable in a bore 36 and controlling a by-pass for leading oil back to the reservoir 33 so as to maintain the oil pressure in the accumulator 36 at substantially constant value.

The passage 32 communicates with the servo motor cylinder 38 on the right side of the piston 8. A rod 40 secured to the latter is adapted for connection with the control device of the prime mover for regulating the supply of energy thereto. Displacement of rod 40 toward the left or the right will respectively increase or decrease said supply and cause an increase or decrease of speed. The cylinder chamber 41 on the left side of piston 8 is closed by a cover 42 and contains a compression spring 43 operating on the piston 8 in opposition to the oil pressure in chamber 38. A submerged small orifice 44 whose effective area may be adjusted by means of a needle valve 45 connects the oil reservoir 33 with the cylinder chamber 41, and a duct 46 connects the latter with a chamber 48 provided at the lower end of the bore 22.

A housing 50 is attached to the governor body 15, with a plate 51 interposed therebetween, and includes a flexible diaphragm or bellows 52 defining a chamber 53 which communicates with chamber 48 by way of a passage formed in plate 51. Conical compression springs 54, 55 are mounted within the housing 50, the former between plate 51 and the bellows, and the latter between the bellows and an adjustable seat 56 having a threaded connection with the housing 50 and provided with a lock nut 58. The rate of deflection of bellows 52 may be varied by changing the axial adjustment of the seat 56. When the latter is in its lowermost position a large number of coils of the springs 54 and 55 are active, and the rate of deflection of the bellows has its maximum designed value. If the seat 56 is raised both springs are compressed, and an increasing number of the larger coils thereof come into contact with their seats and become ineffective, leaving as active coils those of smaller diameter and therefore stiffer. For the uppermost adjustment of seat 56 the springs 54 and 55 may become solidly seated, thus reducing the rate of deflection of the bellows 52 to zero.

A rod 60, attached to the movable wall of bellows 52 and slidably mounted in a bore provided in the seat 56 is connected at its lower end with a solenoid device indicated generally at 59 and including an armature 61 slidably supported by guides 62, 63 and coacting with a solenoid coil 64 connected with a shunt 65 interposed in one of the supply lines of the network 10, the voltage across the shunt, proportional to the generator load, being impressed on the solenoid. An adjustable rheostat 66 and a switch 68 are connected in series with the solenoid. While this example of solenoid arrangement is intended for a direct current system, the modification thereof for application to an alternating current system will be obvious to those skilled in the art.

Assuming that the switch 68 is open, and therefore that the solenoid 59 is inoperative, as the prime mover runs at steady speed the flyballs 18 maintain the pilot valve 21 centered in neutral position as shown in the drawing. The oil in chambers 41, 48 and 53 has the same pressure as in the reservoir 33 with which these chambers communicate through the orifice 44. Neglecting the weight of the pilot valve 21, the centrifugal force and the resilient load applied thereto by the flyballs 18 and the spring 23 respectively are in equilibrium. If the load on the prime mover decreases, the speed increases, and the augmented centrifugal force lifts the pilot valve thus opening the ports 30, causing discharge of oil from chamber 38 to the reservoir 33 and displacement of the servo motor piston 8 toward the right under the load of the compression spring 43. This movement of the servo motor decreases the supply of actuating substance to the prime mover and causes the speed thereof to decrease.

This speed-decreasing movement of the servo motor would eventually be checked as the pilot valve resumes its netural position and closes the ports 30, but by this time the prime mover is decelerating and its speed would continue to drop below normal, whereupon the diminished centrifugal force causes downward movement of the pilot valve, the ports 31 are opened and the servo motor piston moves to the left so as to increase the prime mover supply of actuating substance and the speed thereof. The latter however attains a value higher than the normal speed, and the irregular cyclical speed variation generally referred to as hunting is likely to continue indefinitely. To correct this condition of instability various compensating or stabilizing arrangements have been proposed. According to the invention a variable compensating fluid pressure load is applied to one end of the pilot valve, in a manner to be later described.

Upon a decrease of load on the generator, consequent acceleration of the prime mover and upward displacement of the pilot valve, the servo motor piston 8 begins to move toward the right and oil is sucked from bellows chamber 53 causing contraction of the bellows 52 from its position of resilient equilibrium. Only a small amount of oil flows into chamber 41 from the reservoir 33 through the orifice 44. As a result the oil pressure in chamber 48 temporarily drops below the value of the pressure which surrounds the upper end of the pilot valve 21, and a transient downwardly directed differential pressure load is thus applied to the latter, and restrains the upward displacement thereof. Although this transient restraining action exerted on the pilot valve is very small as compared to the centrifugal force transmitted thereto by the flyballs and by the spring 23, it causes the pilot valve to return sufficiently quickly to its neutral position, so that an underspeed condition of the prime mover does not occur. As the prime mover upon the correcting action of the servo motor gradually returns to normal speed, oil from the reservoir 33 flows through orifice 44 into chambers 41, 48 and 53, thus progressively returning the bellows 52 to its original position of equilibrium and relieving the suction force exerted on the lower end of the pilot valve. The leakage through the orifice 44 is regulated by means of the needle valve 45 in such a manner that the speed of the prime mover returns to normal at the same time that the oil pressure in chamber 48 resumes the same value as in the oil reservoir 33. Furthermore the rate of deflection of bellows 52 may be adjusted by varying the axial position of the lower spring seat 56.

When the load on the prime mover is increased its speed decreases and the action of the governor is the reverse of that just described. The pilot valve is then pressed down by the spring 23 acting against the decreased centrifugal force. This opens the ports 31 to admit pressure oil to the cylinder chamber 38 causing displacement of the servo motor piston 8 to the left and thereby increasing the prime mover supply of actuating substance. Most of the oil displaced by piston 8 from chamber 41 flows to the bellows chamber 53 resiliently expanding the latter, thereby causing increase of oil pressure in chamber 48 so as to exert a transient upward pressure load to the pilot valve to restrain its downward movement. As the pilot valve returns to neutral position upon initiating the speed correcting action of the servo motor, oil leaks through the valve 44, the bellows 52 contracts towards its original position of equilibrium, the oil pressure in chamber 48 resumes the atmospheric value, and the pressure load exerted on the pilot valve returns to zero. This transient restraining action exerted upon the pilot valve 21 and tending to return the same to neutral position is proportional to the square of the speed of motion of the servo piston 8 and therefore is effective to maintain the rate of motion of said piston, hence the rate of variation of the condition controlled thereby, within desired limits even for high rate of change of the input signal applied to the pilot valve. The foregoing restraining action will be more fully set forth in connection with Figure 2.

The above manner of operation is obtained when the switch 68 is open, with the solenoid coil 64 not energized and the armature 61 inoperative. However, when the switch 68 is closed the solenoid is energized and a downwardly directed electromagnetic load proportional to the generator load is applied to the armature 61 and is transmitted by means of the rod 60 to the bellows 52. If the load on the generator supplying the network 10 increases suddenly, the current energizing the solenoid 64 increases accordingly causing a sudden increase of the downward pull that the armature 61 exerts on the bellows 52. The latter will tend to expand, causing suction in chamber 48 and determining a downward movement of the pilot valve so as to uncover the ports 31 and initiate a movement of the servo motor piston 8 in a direction to increase the supply of actuating substance to the prime mover even before the flyballs 18 have detected a drop of speed. The reverse action occurs upon a sudden decrease in electric load in the network 10 which determines a decrease of the downward pull transmitted by the armature 61 to the bellows 52. The latter tends to move upward, increasing the oil pressure in chamber 48 and determining an upward displacement of the pilot valve 21 so as to open ports 30 and initiate an excursion of the servo motor piston 8 in a speed-decreasing direction in anticipation of the prime mover acceleration which would otherwise follow the reduction of load.

It will be noted that the solenoid device 59 actuates the pilot valve in the same manner as and ahead of the time at which the latter would otherwise be actuated by the flyballs, so as to compensate for the delay in the response of the governor and reduce the magnitude of the speed surges occurring under sudden variations of load. Owing to the leakage valve 44 the action of the solenoid device 59 on the pilot valve 21 is of temporary nature. The amount of compensation effected by the solenoid may be adjusted by means of the rheostat 66, and by means of the seat 56 which serves to regulate the rate of deflection of the bellows 52.

It will be appreciated that the oil displacement in chamber 41 due to movement of the servo motor piston 8 is many times larger than the oil displacement in chamber 48 caused by sliding motion of the pilot valve 21. For the purpose of rendering a numerical example more simple it may be assumed that the seat 56 is adjusted in its uppermost position so as to block the diaphragm 52. In which case as the pilot valve 21 or the piston 8 are moving at a given velocity, the corresponding velocity of the oil forced through the orifice 44 is proportional to the square of the effective diameter of said valve or piston, and the change of pressure in chamber 48 is proportional to the fourth power of said diameter. Assuming for instance that the face of the piston 8 defining chamber 41 have an effective diameter four times as large as that of the pilot valve, when the piston 8 is moving at a certain velocity it determines a transient relative pressure in chamber 48 which is 256 times as large as that occurring when the pilot valve 21 is moving at the same velocity. It will therefore be readily understood that where the diameter and stroke of piston 8 are so designed in relation to the pilot valve 21, the orifice 44, suitably adjusted by means of the needle valve 45 for correct operation of the governor, will not oppose any appreciable resistance to the free motion of the pilot valve. The danger that chamber 48 may operate as an objectionable dashpot for the pilot valve and prevent rapid displacement of the latter in response to rapid speed changes, thus resulting in serious overspeed or underspeed upon sudden load variations may therefore be entirely avoided.

Where no anticipatory actuation of the pilot valve by means of the electromagnetic device 59 is desired, the solenoid 59 and the rod 60 may be omitted. Furthermore in substitution for the resiliently loaded bellows 52 other equivalent cushioning means may be provided, such as a resiliently loaded slidable piston, or an air accumulator communicating with chamber 48.

Figure 2 shows a partial modification of Figure 1 indicating an air chamber or accumulator 70 provided in the lower portion of the pilot valve in substitution for the bellows chamber 53, the governor being otherwise similar to that of Figure 1. It will be appreciated that this form of governor is extremely simple, compact and contains a very small number of moving parts as compared to other isochronous governors. It will be noted that in the arrangement shown in Figure 2 the air chamber 70, formed within the lower end of the pilot valve, is very small and the cushioning effect thereof is quite limited. If we assume that this form of governor is used to control a variable-speed powerplant, that the latter is operating at low governed speed, and that the operator suddenly moves the control lever to full-speed setting, then the load of the governor spring 23 will be instantly increased to its maximum designed load corresponding to maximum speed of the powerplant, and as a result the pilot valve 28 will be shifted all the way downward, fully opening the port admitting hydraulic fluid from the high pressure system 31, 36 to the cylinder chamber 38. This motion of the pilot valve will not cause any objectionable pressure rise in the hydraulic fluid at the lower end thereof, as the small volume of fluid displaced by the pilot valve is in part discharged at low velocity through the orifice 44, while the remainder causes a slight compression of the air in the cushion chamber 70. However, the ensuing motion of the piston 8 toward the left displaces fluid at a much higher rate, causing a substantial increase in pressure. The air in the cushion chamber 70 soon contracts to a very small volume, whereupon substantially all of the fluid displaced by the power piston 8 must be discharged through the small orifice 44. The resulting increase in fluid pressure exerts on the lower end of the pilot valve 21 a restraining action tending to return the same to its neutral position, which action is proportional to the square of the speed of motion of the servo piston 8, and is therefore effective to limit the rate of motion thereof. It will be appreciated that by suitably adjusting the effective area of the orifice 44 the maximum rate of motion of the servomotor, and in turn the maximum rate of change in the condition being controlled, may be limited to any desired or predetermined value, said rate varying in relation to the magnitude and suddenness of the input signal or load exerted upon the pilot valve.

In the above disclosed arrangement the governor is adapted to increase or decrease the supply of energy to a prime mover in response to deceleration or acceleration of the latter due to increase or decrease of the load applied thereto respectively. A different arrangement is shown in Figure 3, wherein a governor 6' operates to increase or decrease the load applied to a powerplant 75 in response to deceleration or acceleration of the latter respectively, independently of the supply of energy thereto. A hydraulic governor indicated generally at 6' is driven by means of a shaft 11 and gears 72, 73 from an aircraft engine 75 indicated diagrammatically in reduced scale and connected with a variable pitch propeller having blades 76 automatically controlled by the governor 6' so that their pitch is automatically modified in accordance with variations in the speed of the engine. To this end each blade 76 is rotatable about a spider arm attached to the propeller shaft 78. The latter has an internal chamber 80 and is furnished with a cylindrical cap 81 which is longitudinally movable on the shaft 78 under hydraulic pressure supplied to the chamber 80 from the governor 6'. The cap 81 has two studs 82 which engage slots in lugs 83 carried by the blades 76. When the propeller is in operation centrifugal and aerodynamic forces tend to turn the blades 76 into coarse or maximum pitch against said hydraulic pressure.

The governor 6' may be similar to that disclosed in connection with Figure 1 except that it does not include the bellows chamber 53 nor the solenoid device 59. Furthermore the hydraulic servo motor member or cap 81 is substituted for the servo motor piston 8 of Figure 1.

Under steady flying conditions the pilot valve 21 is in neutral position. If the engine speed increases, as may be due to a dive or to increased manifold pressure, the pilot valve is lifted by the flyballs so as to open the ports 30, pressure oil flows from the propeller chamber 180 (which is in direct communication with chamber 80) through ducts 182, 183 to the reservoir 33, the cap 81 moves to the right causing the propeller pitch to be increased, and the augmented propeller torque slows the engine down to normal speed. Conversely, when the engine speed decreases, as may be due to a climb or to decreased engine manifold pressure, the pilot valve drops and opens the ports 31 to admit pressure oil to the servo motor chamber 180, whereupon the cap 81 moves outwardly and decreases the propeller pitch and the propeller torque until the engine resumes normal speed. It has been found that owing to the considerable inertia of the propeller and to the character of the resistance of the air to the rotation thereof, hunting can be avoided without resorting to compensating devices in the governor. It is therefore unnecessary to provide means for applying a variable operative fluid pressure load at one end of the pilot valve, and hydraulic governors adapted for the control of constant speed propellers and not including any compensating means are well known in the art. According to the invention, however, a variable pressure oil chamber 48' is provided at the lower end of the pilot valve 21 and communicates by means of a leak valve 44' adjustable by way of needle valve 45' with the reservoir 33, and by means of conduits 90 and 91 with the cylinders 86 and 88. A piston 92 slidable in cylinder 86 is connected by a rod 93 with a flexible diaphragm 94 mounted between two cup members 95 and 96 and provides two separate chambers 98 and 100 therein. Springs 101 and 102 are mounted on either side of the diaphragm.

A pressure tube anemometer or Pitot tube 104 includes an open ended inner tube 105 facing the air stream for measuring the total pressure head, and a concentric outer tube 106 having lateral orifices 107 so arranged as to measure the static pressure. The former and latter tubes are connected with chambers 100 and 98 respectively. If the aircraft air speed suddenly increases as it occurs when a dive is initiated the total pressure head in chamber 100 increases, causing displacement of piston 92 toward the left so as to temporarily increase the oil pressure in chamber 48'. The pilot valve is lifted and the propeller cap 81 slides toward the right so as to increase the propeller pitch in advance of the time at which the pilot valve would otherwise have been lifted upon an increase of the centrifugal force transmitted thereto by the flyballs. This advance actuation of the pilot valve by means of the anemometer considerably reduces the engine speed surge that would otherwise occur. Conversely, when the aircraft air speed suddenly decreases, as when a climb is initiated, the total pressure head in chamber 100 decreases, moving the piston 92 toward the right, creating suction in chamber 48' and causing the pilot valve to drop so as to initiate an outward movement of the cap 81 to decrease the propeller pitch ahead of the drop of engine speed which would occur with a conventional governor. The lower cylinder 88 is provided with a piston 109 connected by a rod with a flexible resiliently loaded diaphragm 110 separating chambers 111 and 112. The former is vented to the atmosphere, and the latter is connected by a pipe 114 with the engine manifold 113. A sudden increase of the engine manifold pressure determines a displacement of the diaphragm 110 and piston 109 toward the left and transiently increases the oil pressure in chamber 48' so as to lift the pilot valve 21 and increase the propeller pitch in anticipation of the increase of engine torque. The actuation of the pilot valve 21 by means of the diaphragm 110 and 94 has a temporary character owing to the action of the leak valve 44'.

A still further form of governor, indicated generally at 120, is shown in Figures 4 and 5, wherein a differential oil pressure varying with the speed of the prime mover is employed instead of the centrifugal force for actuating the pilot valve in response to speed variations. The governor 120 includes a housing 121 comprising a gear pump having an idler gear 122 meshing with a driving gear 123 which is keyed to a shaft 124 supported in bearings formed in the pump housing 121 and in the governor body 125. The shaft 124 carries a gear 126 adapted to be driven from the prime mover. A bore 128 coaxial with shaft 124 is formed in the governor body 125, and lateral ports 130, 131 and 132 are connected with said bore. A pilot valve 133 slidably and rotatably mounted in said bore is formed with an intermediate portion of reduced diameter, thus providing an annular open space communicating with ports 131 at all times. The terminal portions of the pilot valve control the ports 130 and 132. When the pilot valve is in neutral position as shown in the drawing the ports 130 and 132 are closed. The ports 132 are connected with a reservoir 134 containing oil at atmospheric pressure, while the ports 130 are connected with an oil accumulator 135 wherein the pressure is kept substantially constant by means of a slidable resiliently loaded piston 136 controlling suitable ports.

The passage 131 leads pressure oil to and from the cylinder chamber 138 for actuating the differential servo motor piston 140, the arrangement being such that a displacement of the latter toward the right tends to increase the speed of the prime mover. The cylinder chamber 141 at the opposite side of the piston may contain a compression spring 142 for resiliently loading the latter, and communicates with an air chamber 143 and, by way of duct 144, with a chamber 145 at the left side of the pilot valve 133. An orifice 146 adjustable by a needle valve 148 is provided between said chamber 145 and a chamber 150 which communicates with the discharge side of the oil pump 123. A duct 151 connects the chamber 152 at the right end of the pilot valve with the oil accumulator 135. The pressure chamber 150 communicates with the oil accumulator 135 by way of an orifice 153 adjustable by means of a resiliently loaded needle valve 154 actuated through a cam 156 by a speed control lever 155. A coil spring 158 has its terminal coils securely attached to the shaft 124 and to the pilot valve 133 so as to drive the latter along in rotation with the former.

The pump 123 discharges a quantity of oil proportional to the speed of the prime mover through the orifice 153 thus determining on opposite sides of the latter a difference of pressure proportional to the square of said speed; this oil flows to the accumulator 135 and thence through ports 160 returns to the reservoir 134 connected with the suction port of the pump. As the upstream and downstream sides of the orifice 153 are in communication with chambers 145 and 152 respectively, an axial oil pressure differential load proportional to the square of the speed and directed toward the right is applied to the pilot valve 133. During steady operation this load is balanced by the tension of the spring 158, and the pilot valve 133 is in neutral position as shown in the drawing. If now the speed of the prime mover increases, the oil delivery and in turn the difference of pressure between chambers 145 and 152 increases, causing displacement of the pilot valve toward the right so that pressure oil is discharged from the cylinder 138 into the reservoir 134. The servo motor piston 140 moves toward the left, tending to decrease the speed of the prime mover. The increase of volume of the cylinder chamber 141 causes an afflux of oil thereto from the air chamber 143 and through the orifice 146 thus causing a temporary drop of pressure in chamber 145. This restrains the excursion of the pilot valve toward the right and prevents overtravel of the latter, as it has already been disclosed in connection with Figure 1, so as to eliminate hunting. Conversely, when the prime mover decelerates the difference of oil pressure between chambers 145 and 152 drops below the tension of spring 158, causes displacement of the pilot valve toward the left and consequent movement of the servo motor piston 140 toward the right tending to increase the prime mover speed. Part of the oil so displaced from chamber 141 flows into chamber 143 against increasing pressure of the air therein, and part is forced through the restricted orifice 146. The temporary oil pressure increase in chamber 145 restrains the excursion of the pilot valve toward the left and prevents overcorrection on the part of the servo motor. As the speed gradually returns to normal, owing to the leak valve 146 the pressure in chambers 145, 143 and 141 progressively resumes the same value as in chamber 150.

The speed at which the governor maintains the prime mover is dependent upon the effective area of the orifice 153. Inward or outward movement of the needle valve 154 obtained by adjusting the speed control lever 155 causes decrease or increase of said area and determines decrease or increase of said speed, respectively. Unlike the governors provided with centrifugal flyballs the governor 120 has the same regulating energy at all speeds.

When the governor is employed for the speed regulation of a prime mover used for the propulsion of a vehicle such for example as a locomotive or other railroad or highway vehicle, a device responsive to angular acceleration as diagrammatically shown in smaller scale at 162 may be employed for the anticipatory actuation of the pilot valve thereof. A cylinder 163 secured to the prime mover or other fixed part of the vehicle has slidably mounted therein a piston 164 connected by a rod 165 with a lever 166 pivoted on the axis 168 and carrying at its ends weights 170 whose distance from the axis 168 may be adjusted by means of their threaded connection with lever 166. The center of gravity of the oscillating system including lever, piston and connecting rod is located at the center of the pivot 168. This system is thus in indifferent equilibrium and the angular adjustment thereof relative to the cylinder 163 does not vary upon any translational acceleration of the vehicle. The cylinder chamber 171 above piston 164 is connected by way of a conduit 172 provided with a dampening orifice adjustable by means of a needle valve 173 with the servo motor cylinder 141. Springs 174 may be provided tending to hold the oscillating lever in preselected position. It is assumed that the vehicle equipped with the regulator 162 proceeds in the direction of arrow V. As long at is advances on constant grade the piston 164 remains stationary but as soon as a steeper upward grade is encountered and both the vehicle and the cylinder 163 undergo a slight counter-clockwise rotation about an axis parallel to the pivot 168 the inertia of the oscillating system 166 causes a downward movement of piston 164 relative to the cylinder 163 and oil is sucked from chamber 141. The oil pressure in chamber 145 drops, the pilot valve moves toward the left so as to initiate a displacement of the servo motor piston 140 toward the right tending to increase the speed of the prime mover in advance of the time at which deceleration otherwise resulting would be detected by the governor. The temporary deceleration of the vehicle is thus substantially reduced. Conversely, when a downward directed grade variation is encountered, a slight clockwise rotation of the cylinder 163 occurs, the piston 164 moves inward relatively to the cylinder forcing oil into chamber 141, and displacing the pilot valve 133 toward the right so as to initiate a movement of the servo motor in a direction to decrease the speed of the prime mover.

It will be readily understood that the angular acceleration responsive device 162 may also be used in connection with centrifugally actuated governors such as 6 and 6' as shown in Figure 6. It may be further employed in aircraft installations in substitution for the anemometer 104 to actuate the governor pilot valve so as to initiate a propeller pitch increasing or decreasing movement of the servo motor as soon as the aircraft initiates a dive or a climb, respectively, as shown in Figure 7. In these aircraft applications gyroscopic means may be advantageously substituted for the comparatively heavy and bulky oscillating lever 166, as will appear obvious to those skilled in the art. Such a substitution is shown in Figure 8, in which the piston 164 is positioned through a rod 165' from a gyroscope 180 which may be of conventional construction and which is well known in the art as an element.

While the hydraulic medium used in the various governors disclosed has been referred to as lubricating oil, any other appropriate fluid may be used in substitution therefor. In the above disclosed speed regulating systems a decrease of pressure of the fluid actuating the servo motor thereof causes a reduction of speed of the prime mover. For example, in Figure 1 a pressure drop in the cylinder chamber 38 causes a movement of the piston 40 to the right which, as indicated by the arrow, determines a reduction of prime mover speed. This may be considered a safety feature, for an accidental interruption in the supply of the actuating pressure fluid to the servo motor, as may be due to failure of the fluid pump or rupture of a fluid conduit causes the prime mover to stop. While I have shown and described only certain preferred embodiments of my invention by way of illustration, many modifications will occur to those skilled in the art and I therefore wish to have it understood that I intend in the appended claims to cover all such modifications as fall within the true spirit and scope of my invention. And where claims are directed to less than all the elements of the complete system disclosed, they are intended to cover possible uses of the recited elements in installations which may not include the non-recited elements.

I claim:

1. A hydraulic governor for a variable pitch propeller driven by an aircraft propulsion powerplant having an air induction system, comprising a hydraulic pressure operated regulator member for controlling the blade angle of the propeller, a pilot valve movable in opposite directions to move said regulator member in opposite directions, powerplant speed responsive means for moving the pilot valve, a fluid pressure chamber and a piston movable directly with said pilot valve for compressing and expanding said chamber upon movement of the pilot valve in opposite directions, a first accumulator chamber including first movable wall means and resilient means normally retaining said first wall means in a neutral position, a second accumulator chamber including second movable wall means and resilient means normally retaining said second wall means in a neutral position, said first and second accumulator chambers being in free fluid communication with said fluid pressure chamber, a pressure responsive device connected with the air induction system of the powerplant for varying the neutral position of the first wall means in response to changes of pressure in said induction system, and aircraft velocity measuring apparatus for modifying the neutral position of the second wall means in response to variations in aircraft velocity.

2. A hydraulic governor for aircraft propulsion powerplant having an air induction system and driving a variable-pitch propeller, comprising a hydraulic pressure operated regulator member for varying the propeller pitch, a pilot valve movable in opposite directions to move said regulator member in opposite directions, powerplant speed responsive means for moving said pilot valve, a fluid pressure chamber and a piston movable directly with said pilot valve for compressing and expanding said chamber upon movement of the pilot valve in opposite directions, a first compensating chamber including first movable wall means and resilient means normally retaining said first wall means in a neutral position, a second compensating chamber including second movable wall means and resilient means normally retaining said second wall means in a neutral position, said first and second compensating chambers being in free fluid communication with said fluid pressure chamber, leakage means connected with said chambers for dissipating in time the pressure variations therein, a pressure responsive device connected with the air induction system of the powerplant for varying the neutral position of the first wall means in response to changes of pressure in said induction system, and aircraft velocity measuring apparatus for modifying the neutral position of the second wall means in response to variations in aircraft velocity.

3. A hydraulic governor for aircraft propulsion powerplant having an air induction system and driving a variable-pitch propeller, comprising a hydraulic pressure operated regulator member for varying the propeller pitch, a pilot valve movable in opposite directions to move said regulator member in opposite directions, powerplant speed responsive means for moving the pilot valve, a fluid pressure chamber and a piston movable directly with said pilot valve for compressing and expanding said chamber upon movement of the pilot valve in opposite directions, a first compensating chamber including first movable wall means and resilient means normally retaining said first wall means in a neutral position, a second compensating chamber including second movable wall means and resilient means normally retaining said second wall means in a neutral position, said first and second compensating chambers being in free fluid communication with said fluid pressure chamber, leakage means connected with said chambers, a pressure responsive device connected with the air induction system of the powerplant for varying the neutral position of the first wall means, and aircraft velocity measuring apparatus for modifying the neutral position of the second wall means.

4. In governing apparatus for a variable pitch propeller driven by an aircraft propulsion powerplant having an air intake system, the combination with input means responsive to changes in powerplant speed and output means for controlling the blade angle of the propeller, of a mechanism having a servo motor for variably positioning said output means, a movable control element for controlling said servo motor, means for actuating said control element from said input means, means for providing a space for fluid under variable pressure, a surface area movable with said control element and subject to the fluid pressure in said space for applying to said control element in the direction of motion thereof a force proportional to said fluid pressure, first and second wall means each movable to vary the fluid pressure therein and actuate said control element, a sensor device responsive to change of aircraft speed for moving one of said wall means, and a second device responsive to variations of pressure in said air intake system for moving the other wall means.

5. In a governing system for a variable pitch propeller driven by an aircraft propulsion powerplant, the combination with input means responsive to changes in powerplant speed and output means for controlling the blade angle of said propeller, of a mechanism having a servo motor for variably positioning said output means, a movable control element for controlling said servo motor, means for actuating said control element from said input means, a fluid pressure chamber, leakage means connected to said chamber for dissipating in time the pressure change therein, a surface area movable with said control element and subject to the fluid pressure in said chamber for applying to said control element in the direction of motion thereof an actuating force proportional to the pressure in said chamber, said chamber including wall means movable to alter the fluid pressure therein and actuate said control element, and a Pitot tube sensing variations of aircraft air speed for moving said wall means to cause transient variations in the blade angle of the propeller upon changes of aircraft air speed.

6. In a governing system for the variable pitch propeller of an aircraft propulsion powerplant, the combination with regulating means movable to adjust the blade angle of the propeller, of a servomotor for actuating said regulating means, a movable control element for controlling the servomotor, powerplant speed responsive means for actuating said control element in the direction tending to maintain substantially constant powerplant speed, a fluid pressure chamber, leakage means connected with said chamber for dissipating the pressure change therein, first wall means movable with said control element and subject to the pressure of fluid in said chamber for applying to said control element in the direction of motion thereof an actuating force proportional to the pressure in said chamber, second wall means movable to set up pressure variations therein, and means responsive to variations of aircraft velocity for moving the second wall means in the sense tending transiently to decrease or increase the powerplant speed upon increase or decrease of aircraft velocity, respectively.

7. In a governing system for the variable pitch propeller of an aircraft powerplant having an air intake system, the combination with regulating means for adjusting the blade angle of the propeller, of a servomotor for operating said regulating means, a control element for controlling the servomotor, powerplant speed responsive means for actuating said control element in a direction tending to maintain substantially constant powerplant speed, a fluid pressure chamber, first wall means movable with said control element and subject to the pressure of fluid in said chamber for applying to said control element in the direction of motion thereof an actuating force proportional to the pressure in said chamber, second and third wall means each movable to cause pressure variations therein, means responsive to a function of the aircraft velocity for moving the second wall means, and means responsive to a function of the pressure in said air intake system for moving the third wall means.

8. In a governing apparatus for the variable pitch propeller of an aircraft engine, the combination with regulating means for varying the blade angle of the propeller, of motor means for actuating said regulating means, a control member for controlling said motor means, engine speed responsive means for moving said control member, a fluid pressure chamber, means for moving said control member in response to pressure variations in said chamber, movable wall means for causing pressure variations therein, and means responsive to motion of the aircraft indicating the initiation of climb or dive for actuating said wall means.

9. In a governor for a variable pitch propeller driven by an aircraft engine, the combination with regulating means operable to increase or decrease the blade angle of the propeller, of motor means for actuating said regulating means, a control member for controlling said motor means, engine speed responsive means for actuating said control member, a fluid pressure chamber, means for moving said control member in response to pressure variations in said chamber, movable wall means for causing pressure variations therein, and gyroscopic means sensing initiation of climb or dive of the aircraft for actuating said wall means.

10. In governing apparatus for aircraft propulsion powerplant having a variable pitch propeller and an air intake system, the combination with input means responsive to changes in powerplant speed and output means for controlling the blade angle of said propeller, of a mechanism having a servo motor for variably positioning said output means, a movable control element for controlling said servo motor, means for actuating said control element from said input means, means for providing a space for fluid under variable pressure, a surface area movable with said control element and subject to the fluid pressure in said space for applying to said control element in the direction of motion thereof a force proportional to said fluid pressure, a source of fluid at substantially constant pressure, leak orifice means for connecting said space with said source, first and second wall means each movable to alter the volume of said space for transiently varying the fluid pressure therein and actuating said control element, a sensor device responsive to change of aircraft speed for moving one of said wall means, and a second device responsive to variations of pressure in said air intake system for moving the other wall means.

11. In a governing system for aircraft propulsion powerplant having a variable pitch propeller, the combination with input means responsive to changes in powerplant speed and output means for controlling the blade angle of said propeller, of a mechanism having a servo motor for variably positioning said output means, a movable control element for controlling said servo motor, means for actuating said control element from said input means, a fluid pressure chamber, a surface area movable with said control element and subject to the fluid pressure in said chamber for applying to said control element in the direction of motion thereof an actuating force proportional to the pressure in said chamber, a source of fluid at substantially constant pressure, leak orifice means for connecting said source with said chamber to dissipate gradually the pressure variations in said chamber, said chamber including wall means movable to alter the volume of said chamber for transiently varying the fluid pressure therein and actuating said control element, and a Pitot tube sensing variations of air speed for moving said wall means.

12. In a governing system for the variable pitch propeller of an aircraft propulsion powerplant, the combination with regulating means movable to adjust the blade angle of the propeller, of a servomotor for actuating said regulating means, a movable control element for controlling the servomotor, powerplant speed responsive means for actuating said control element to maintain substantially constant powerplant speed, a fluid pressure chamber, first wall means movable with said control element and subject to the pressure of fluid in said chamber for applying to said control element in the direction of motion thereof an actuating force proportional to the pressure in said chamber, leak orifice means for gradually dissipating the variations of pressure in said chamber, second wall means movable to alter the volume of said chamber for setting up transient pressure variations therein, and means responsive to variations of aircraft velocity for moving the second wall means in the sense tending to decrease or increase the powerplant speed upon increase or decrease of aircraft velocity, respectively.

13. In a governing system for the variable pitch propeller of an aircraft powerplant having an air intake system, the combination with regulating means for adjusting the blade angle of the propeller, of a servomotor for operating said regulating means, a control element for controlling the servomotor, powerplant speed responsive means for actuating said control element to maintain substantially constant powerplant speed, a fluid pressure chamber, first wall means movable with said control element and subject to the pressure of fluid in said chamber for applying to said control element in the direction of motion thereof an actuating force proportional to the pressure in said chamber, leak orifice means for gradually dissipating the variations of pressure in said chamber, second and third wall means each movable to alter the volume of said chamber for causing transient pressure variations therein, means responsive to a function of the aircraft velocity for moving the second wall means, and means responsive to a function of the pressure in said air intake system for moving the third wall means.

14. In a governing apparatus for the variable pitch propeller of an aircraft powerplant, the combination with regulating means for varying the blade angle of the propeller, of motor means for actuating said regulating means, a control member for controlling said motor means, means for moving said control member upon changes of powerplant speed, a fluid pressure chamber, means for moving said control member in response to pressure variations in said chamber, a leak valve for dissipating in time the pressure changes in said chamber, movable wall means for varying the volume of said chamber and causing transient pressure variations therein, and gyroscopic means sensing changes in aircraft attitude indicating the initiation of climb or dive for actuating said wall means.

15. In a governor for the variable pitch propeller of an aircraft engine, the combination with regulating means operable to increase or decrease the blade angle of the propeller, of motor means for actuating said regulating means, a control member for controlling said motor means, engine speed responsive means for actuating said control member to maintain the engine speed substantially at a desired value, a fluid pressure chamber, means for moving said control member in response to pressure variations in said chamber, a leak valve for dissipating in time the pressure changes in said chamber, movable wall means for varying the volume of said chamber and causing transient pressure variations therein, and gyroscopic means for actuating said wall means upon initiation of aircraft climb or dive.

References Cited in the file of this patent

UNITED STATES PATENTS

| | | |
|---|---|---|
| 2,233,307 | Dodson | Feb. 25, 1941 |
| 2,245,562 | Becker | June 17, 1941 |
| 2,252,693 | Becker | Aug. 19, 1941 |
| 2,396,321 | Goddard | Mar. 12, 1946 |
| 2,407,317 | Mennesson | Sept. 10, 1946 |
| 2,410,774 | Chandler | Nov. 5, 1946 |
| 2,516,828 | Reggio | July 25, 1950 |
| 2,769,432 | Massey | Nov. 6, 1956 |
| 2,812,746 | Reggio | Nov. 12, 1957 |